United States Patent [19]

Limoncelli

[11] 4,444,366
[45] Apr. 24, 1984

[54] OIL TANK FOR AIRCRAFT

[75] Inventor: Anthony F. Limoncelli, Marlborough, Conn.

[73] Assignee: United Technologies Corporation, Hartford, Conn.

[21] Appl. No.: 352,486

[22] Filed: Feb. 25, 1982

[51] Int. Cl.³ .......................... B64D 37/02; B65D 6/02
[52] U.S. Cl. ................................. 244/135 R; 220/1 B; 220/3; 220/86 R; 220/5 A; 220/85 S; 141/325
[58] Field of Search .......... 244/135 R, 135 B, 135 C; 220/1 B, 3, 5 A, 85 S, 86 R; 141/325

[56] References Cited

U.S. PATENT DOCUMENTS 2,621,719  12/1952  Eaton et al. .................. 244/135 B Primary Examiner—Trygve M. Blix
Assistant Examiner—Ivy M. Shum
Attorney, Agent, or Firm—Norman Friedland

[57] ABSTRACT

An oil tank for an aircraft mounted engine compensates for differences in oil capacity occasioned when the oil tank in each engine mounted under the wing is oriented with respect to the wing's dihedral angle and the angle of the engine which is normal to the wing. The tank includes a first portion for receiving the oil and integral expansion portion where the oil tank is below the right wing dihedral and the expansion is above the left wing dihedral.

4 Claims, 7 Drawing Figures

OIL TANK FOR AIRCRAFT

TECHNICAL FIELD

This invention relates to oil tanks and particularly to oil tanks for engines mounted under the wings of aircraft having different dihedral angles.

BACKGROUND ART

Typically, each engine carries its own oil tank which is generally cylindrically shaped with a feeding line mounted intermediate the vertical and horizontal center lines. The lowest point with respect to the horizon in the feeder line dictates the level of oil in the tank. In aircraft whose wings have different dihedral angles each tank mounted in the engine which is mounted such that it is vertical normal to the wing, will contain a different capacity.

This invention serves to eliminate this difference in oil capacity between tanks by designing each tank with a pair of interconnected cooperating compartments such that the upper one is an expansion receptical and is above the left wing dihedral and the lower tank is the oil reservoir and is below the right wing dihedral, or vice versa.

DISCLOSURE OF INVENTION

An object of this invention is to provide an improved oil tank that exhibits substantially equal capacity between two filled tanks substantially independent of their orientation.

A feature of this invention is to provide for an aircraft engine oil tank a pair of vertically spaced interconnected tanks where the upper tank serves for collecting liquid upon expansion and the lower has a top wall for limiting the filled capacity and when a pair are mounted on opposed dihedrally angled wings, the upper tank is above the dihedral angle of one wing and the lower tank is below the dihedral angle of the other wing.

Other features and advantages will be apparent from the specification and claims and from the accompanying drawings which illustrate an embodiment of the invention.

BEST MODE FOR CARRYING OUT THE INVENTION

Figure 1:
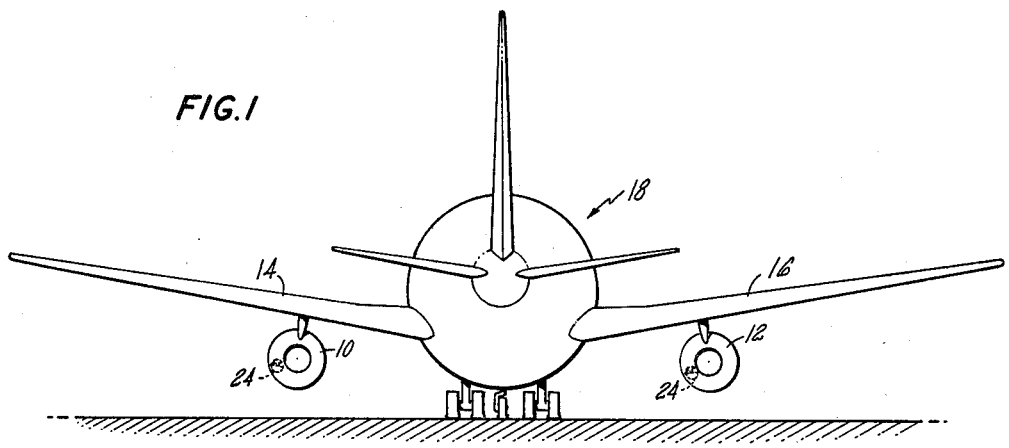
FIG. 1 is a rear view in elevation of a pair of engines mounted on the dihedrally angled wings of an aircraft.
Figure 2B:
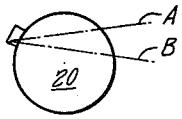
FIG. 2B is the identical tank illustration the effect that the dihedral angle has on the full capacity of the tank.
Figure 2:
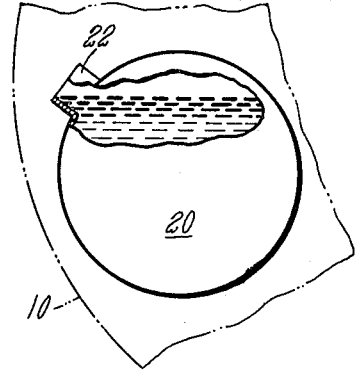
FIG. 2 is an end view partly in section showing a prior art oil tank mounted on the left wing.
Figure 2A:
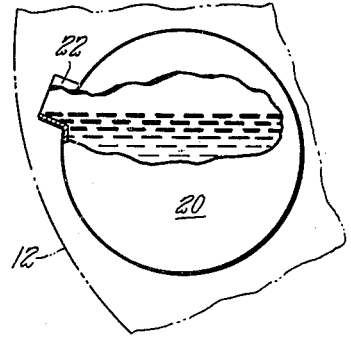
FIG. 2A is the identical tank shown mounted on the opposite wing.

As disclosed in FIG. 1, the engines 10 and 12 are suitably mounted to the wings 14 and 16 of aircraft 18 and are conventionally oriented normal to the wings. This essentially orients the oil tanks in the engine to assume an angle relative to the dihedral angle of the wing which typically displaces the tank vertical line relative to the earth's horizon. The effect of this type of assembly causes the oil in each of the tanks to assume the level that conforms to the earth's horizon which is at an angle relative to the vertical. FIGS. 2, 2A and 2B, depicts those relationships as shown in a typical prior art, round oil tank 20. As a result of this orientation each tank that is identically dimensioned will carry a different volume of oil. As can be seen in FIGS. 2 and 2A the full level of the oil is dictacted by the opening of the fill spout 22 and the oil can only be filled to the lower-most dimension of opening 22. It is apparent from the foregoing that the oil tank in the engine on the left wing (FIG. 2) carries a larger oil capacity than the oil tank in the engine mounted on the right wing. This is illustrated in FIG. 2B showing the different levels depicted by lines A and B of the respective tanks which essentially coincide with the wing's dihedral angles.

Figure 3:
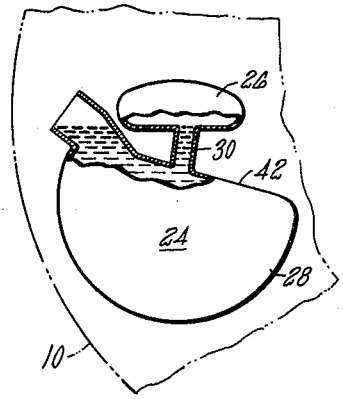
FIG. 3 shows an end view partly in section of the tank of this invention.
Figure 3B:
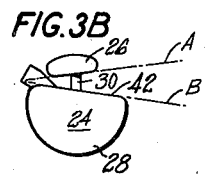
FIG. 3B is a reduced sized view of the identical tank illustrating the upper and lower portion relative to the wing's dihedral angles.
Figure 3A:
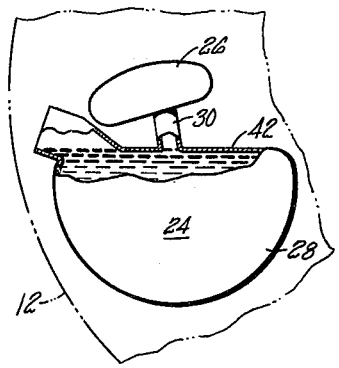
FIG. 3A is the identical tank mounted on the opposite wing.

According to this invention and as can be seen in FIGS. 3 and 3A the tanks 24 are formed into an upper portion 26 adapted to receive the excess or expansion oil and the lower portion 28, vertically displaced from the upper portion defining the oil reservoir. The upper and lower tanks 26 and 28 respectively are interconnected by connector 30 as can be seen in FIG. 3B. The lower tank 28 is generally configured cross sectionally in a round shape and the top wall 42 is flattened and angled to coincide with one of the wing's dihedral angle. The bottom wall of the upper tank 26 is likewise flattened and coincides with the opposite wing's dihedral angle. Hence, when the tanks are mounted in the engines and the engines are, in turn, mounted on the wings of the aircraft, the tanks will be oriented as shown, and the level of oil in each tank will have substantially the same amount of oil.

For example, the difference in oil capacity between the tanks in engines on opposite wings of a given aircraft amounted to 1.5 gallons. The improved tank had significantly less of a differential.

It should be understood that the invention is not limited to the particular embodiments shown and described herein, but that various changes and modifications may be made without departing from the spirit and scope of this novel concept as defined by the following claims.

I claim:

1. An aircraft having dihedral angled disposed wings, at least one engine on each wing, an engine oil tank for supplying oil to each engine for powering said aircraft, each of said tanks having a lower portion defining a reservoir for said oil and an upper portion defining an expansion chamber and a connection therebetween, said lower portion having a top wall that is angled substantially parallel with the dihedral angle of one wing and the expansion chamber having a bottom wall that is angled substantially parallel with the dihedral angle of the opposing wing, whereby the filled capacity of each tank will be substantially equal relative to each other.

2. An aircraft as claimed in claim 1 wherein each of said engine oil tanks includes an inlet spout for admitting oil to said tank mounted at the top quadrant of said lower portion.

3. An aircraft as claimed in claim 2 wherein said lower and upper portions of each of said tanks are substantially rounded in cross section.

4. An aircraft as claimed in claim 3 wherein said upper portion of each of said tanks is above the dihedral angle of one wing and said lower portion of said tank is below the dihedral angle of the other wing.

* * * * *